US008161965B2

(12) United States Patent
Palmieri

(10) Patent No.: US 8,161,965 B2
(45) Date of Patent: *Apr. 24, 2012

(54) VACUUM SOLAR THERMAL PANEL

(75) Inventor: Vittorio Palmieri, Geneva (CH)

(73) Assignee: TVP Solar SA, Geneva (CH)

( * ) Notice: Subject to any disclaimer, the term of this patent is extended or adjusted under 35 U.S.C. 154(b) by 741 days.

This patent is subject to a terminal disclaimer.

(21) Appl. No.: 12/183,968

(22) Filed: Jul. 31, 2008

(65) Prior Publication Data

US 2010/0006090 A1    Jan. 14, 2010

(30) Foreign Application Priority Data

Jul. 9, 2008  (IT) .............................. MI2008A1245

(51) Int. Cl.
*F24J 2/46*  (2006.01)
*F24J 2/05*  (2006.01)

(52) U.S. Cl. ................ 126/704; 126/658; 29/890.033

(58) Field of Classification Search ............... 126/634, 126/651–657, 701, 704, 708, 658, 661; 29/890.033, 29/890.07; 65/17.1, 32.2, 33.5, 34, 36, 40, 65/42, 49, 50, 59.1, 59.2, 59.23, 59.26, 59.27, 65/59.28, 59.32, 59.35, 59.6, 59.7, 59.5, 65/79, 140, 152, 153, 154

See application file for complete search history.

(56) References Cited

U.S. PATENT DOCUMENTS

| | | | | |
|---|---|---|---|---|
| 2,010,145 A | * | 8/1935 | Eitel ........................... 403/28 |
| 2,057,452 A | * | 10/1936 | Scott ........................... 403/28 |
| 2,122,453 A | * | 7/1938 | Clause ........................ 428/34 |
| 2,336,488 A | * | 12/1943 | Litton ......................... 285/187 |
| 2,348,297 A | * | 5/1944 | Huddle ..................... 52/204.593 |
| 2,457,144 A | * | 12/1948 | Goodale ..................... 65/59.24 |
| 2,589,064 A | * | 3/1952 | Drake ........................ 52/786.1 |
| 2,640,167 A | * | 5/1953 | Atlee et al. .................. 378/139 |
| 2,708,774 A | * | 5/1955 | Seelen ......................... 428/34 |
| 2,889,952 A | * | 6/1959 | Claypoole .................. 220/2.1 A |
| 3,417,274 A | * | 12/1968 | Sprague et al. ............... 313/482 |

(Continued)

FOREIGN PATENT DOCUMENTS

EP    1 706 678 B1    8/2007

(Continued)

OTHER PUBLICATIONS

U.S. Appl. No. 12/962,398, filed Dec. 7, 2010, Palmieri.

(Continued)

*Primary Examiner* — Kenneth B Rinehart
*Assistant Examiner* — Joanna Davis
(74) *Attorney, Agent, or Firm* — Oblon, Spivak, McClelland, Maier & Neustadt, L.L.P.

(57) ABSTRACT

Vacuum solar thermal panel comprising
a vacuum envelope (30) defining a sealed volume, able to withstand atmospheric pressure when evacuated, at least one heat absorber (12) being disposed inside the vacuum envelope (30), a pipe (13) entering and exiting the envelope (30) and being in contact with the heat absorber (12), said vacuum envelope (30) comprising a first plate (1; 101) made of glass, a peripheral frame (3) disposed substantially at the periphery of the first plate (1; 101), a metallic peripheral belt (4, 5; 104) joining the peripheral frame (3) to the first plate (1; 101), said metallic peripheral belt (4; 104) being joined to the first plate (1; 101) by means of a vacuum tight bulk glass-metal seal (8; 108), comprising glass material (14; 114) and obtained by fusion and subsequent solidification of said glass material (14; 114).

10 Claims, 5 Drawing Sheets

U.S. PATENT DOCUMENTS

| | | | |
|---|---|---|---|
| 3,632,325 A * | 1/1972 | Evey et al. | 65/56 |
| 3,646,405 A * | 2/1972 | Wallis et al. | 361/518 |
| 3,695,860 A * | 10/1972 | Katuta | 65/154 |
| 3,981,293 A | 9/1976 | Gillery | |
| 4,029,080 A * | 6/1977 | Warren | 126/643 |
| 4,095,428 A | 6/1978 | Warren | |
| 4,332,241 A | 6/1982 | Dalstein et al. | |
| 4,426,996 A * | 1/1984 | Ure et al. | 126/655 |
| 4,493,940 A | 1/1985 | Takaoka | |
| 4,640,700 A | 2/1987 | Takei | |
| 4,716,082 A * | 12/1987 | Ahearn et al. | 428/428 |
| 4,752,265 A * | 6/1988 | Fendley et al. | 445/30 |
| 4,915,719 A * | 4/1990 | Saffari | 65/32.2 |
| 6,324,870 B1 * | 12/2001 | Chabin et al. | 65/154 |
| 6,444,281 B1 * | 9/2002 | Wang et al. | 428/34 |
| 6,976,372 B2 * | 12/2005 | Cooper et al. | 65/34 |
| 2005/0181925 A1 | 8/2005 | Kuckelkorn et al. | |
| 2007/0039611 A1 * | 2/2007 | Benvenuti | 126/652 |
| 2008/0166570 A1 * | 7/2008 | Cooper | 428/426 |

FOREIGN PATENT DOCUMENTS

| | | |
|---|---|---|
| FR | 2 492 956 | 4/1982 |
| GB | 1 439 444 | 6/1976 |
| GB | 2 259 732 A | 3/1993 |
| GB | 2 261 247 A | 5/1993 |
| JP | 59 119137 A | 7/1984 |

OTHER PUBLICATIONS

U.S. Appl. No. 12/812,243, filed Jul. 9, 2010, Palmieri.

International Preliminary Report on Patentability including Written Opinion of the interantional Searching Authority, issued Jan. 11, 2011 in international Application No. PCT/EP2009/004937, Jul. 8, 2009.

U.S. Appl. No. 13/056,532, filed Jan. 28, 2011, Palmieri.

U.S. Appl. No. 13/120,565, filed Mar. 23, 2011, Palmieri.

European Office Action issued Oct. 20, 2011 in Europe Patent Application No. 09777035.8. (EP 2 283 282 B1 resulting from Office Action).

* cited by examiner

VACUUM SOLAR THERMAL PANEL

The present invention relates to a vacuum solar thermal panel and a method for the production of said vacuum solar thermal panel according to the preamble of the main claims.

Evacuated tube solar panels are normally obtained by connecting in parallel multiple heat pipes, with heat absorber fins attached thereto, sealed in individual evacuated glass tubes.

This design has the drawback of providing significant dead space in between heat absorbers as well as having a significant portion of the heat transfer fluid circuitry outside vacuum insulation.

To overcome these limitations, flat vacuum solar thermal panels have been developed comprising a flat vacuum tight envelope with a glass plate transparent to the visible solar radiation. Inside the vacuum envelope there are disposed heat absorbers and a pipe entering and exiting the envelope connected to the heat absorbers. The solar radiation enters the envelope through the glass plate, is absorbed by the heat absorbers and converted into heat, which is transferred to the pipe and to the thermal fluid flowing in the pipe. Vacuum is kept inside the envelope enclosing the heat absorbers and the pipe connected thereto, in order to prevent heat from escaping to the external environment by means of convection.

U.S. Pat. No. 4,332,241 and EP 1706678 disclose a vacuum solar thermal panel comprising two parallel glass plates and a metallic spacing frame for supporting the glass plates in a spaced-apart arrangement. Surface portions of the glass plates have a metallic coating, in order to allow soldering to the metallic spacing frame, thus providing a vacuum tight sealing between the glass plates and the metallic spacing frame. Furthermore, the spacing frame preferably comprises deformable bars or ribbons made of lead or soft metal to be soldered to the metallic coating of the glass plates, in order to limit the stress induced in the glass-metal seal by thermal expansion and pressure differences.

GB 2259732 discloses a thermal insulation panel with two parallel plates and a flexible peripheral seal, preferably made of silicon rubber or polysulfide, to allow a movement of the plates relative to each other due to the thermal expansion of the gas contained inside the panel.

Both these technologies have severe intrinsic limitations. Most soft metals (i.e. lead) are toxic and their use is becoming more and more restricted.

Metallization of glass relies on surface coatings which can deteriorate much faster than bulk materials due to the fact that they extend only for few atomic layers. On the other hand glues, silicon rubber or polysulfide allow gas permeation over time, because of their organic constituents, thus preventing their use for long term high vacuum applications.

An object of the present invention is to overcome these limitations by providing a vacuum solar thermal panel comprising a long lasting and reliable vacuum envelope.

Another object of the present invention is to reduce the stress applied to the glass-metal seal due to the atmospheric pressure and thermal expansion.

Another object of the invention is to provide a flat vacuum solar thermal panel with two parallel plates.

A further object of the invention is to provide a method for obtaining such a vacuum solar thermal panel.

The present invention will be more fully understood and appreciated from the following detailed description taken in conjunction with the attached drawings, in which.

Figure 1:
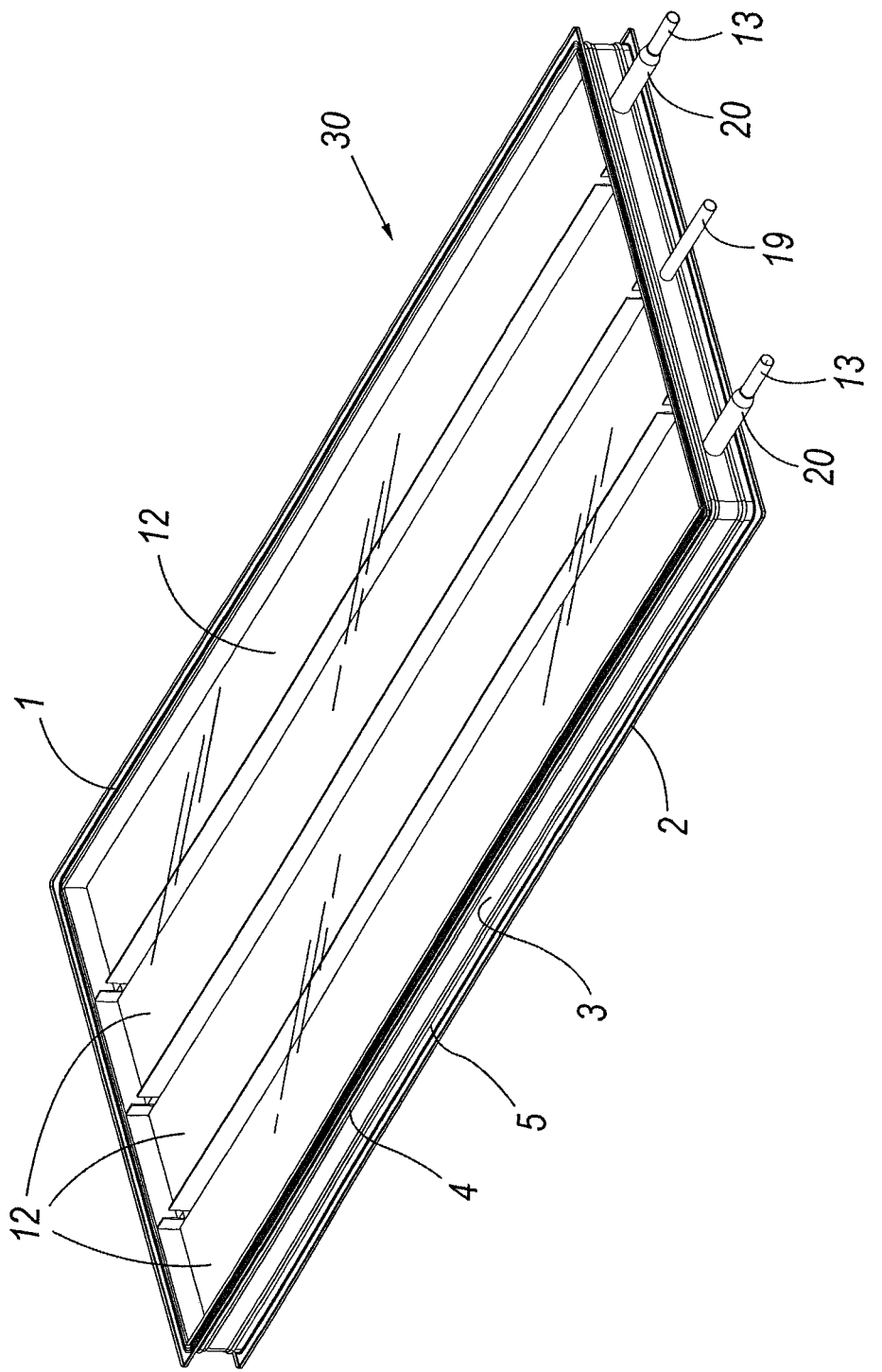
FIG. 1 shows a perspective view of a vacuum solar thermal panel according to the invention.

The vacuum solar thermal panel according to the invention (FIGS. 1 and 2) comprises a vacuum envelope 30 defining a sealed volume, able to withstand atmospheric pressure when evacuated, with at least a first plate 1 made of glass transparent to the visible solar radiation. A pipe 13 for the thermal fluid with attached multiple heat absorbers 12 in good thermal contact with the same pipe is enclosed in the vacuum envelope to avoid heat transfer to the environment due to convection. Said pipe 13 enters and exits the vacuum envelope 30 through the exit ports 20. Of course more than one such a pipe 13 can be present.

The vacuum envelope 30 can have a first and a second parallel plates 1 and 2, both made of glass, or a first plate 1, made of glass, and a second plate 2, made of metal, kept in a spaced-apart arrangement by a chassis 18, disposed inside the envelope 30 between the plates 1 and 2, and a peripheral frame 3. Said chassis 18 and the peripheral frame 3 can also support parts of the pipe 13 inside the envelope 30 and the heat absorbers 12 connected thereto.

As shown in FIG. 1 the thermal solar panel is flat. The vacuum envelope 30 of the panel comprises a first and a second plates 1 and 2, made of glass, and a metallic peripheral frame 3. It also comprises two metallic peripheral belts 4 and 5 each one joining the glass plates 1 and 2 with the metallic peripheral frame 3. If the above plates are made of glass, the solar panel has two active surfaces (double sided flat panel), one collecting the solar radiation directly from the sun and the other collecting the solar radiation reflected by a mirror (not shown in the figure).

In case the first plate 1 should be of glass and the second plate 2 of metal the solar panel would be single sided, i.e. with only one side capable of collecting solar radiation. When the second plate is made of metal, the peripheral frame can be directly joined to the second plate by means of conventional metal-metal soldering, without the presence of a flexible peripheral belt.

Glass plate composition should be chosen such as to maximise transparency (transmission coefficient $\geq 0.91$). Advantageously anti-reflective and/or infrared mirror coatings are applied on the outer and inner surfaces, respectively. Additionally, glass should be thermally pre-stressed or stratified to improve safety and reduce thickness. In the case of thermally pre-stressed extra-clear soda lime float glass, the thickness should be about 5 mm.

Figure 2:
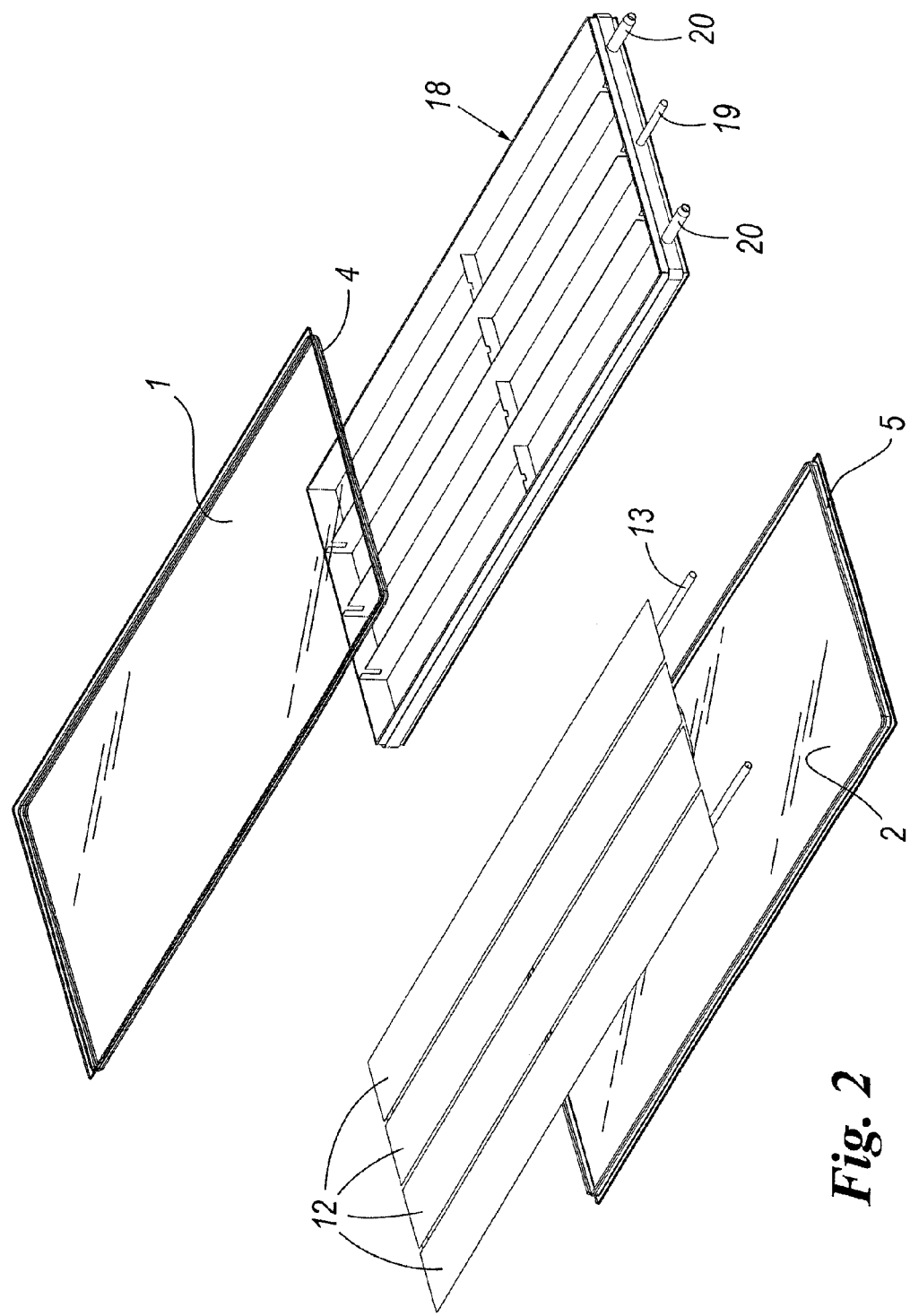
FIG. 2 shows an exploded view of the panel.

FIG. 2 shows an exploded view of the panel, wherein the elements thereof are separated, in order to be better identified.

Figure 3:
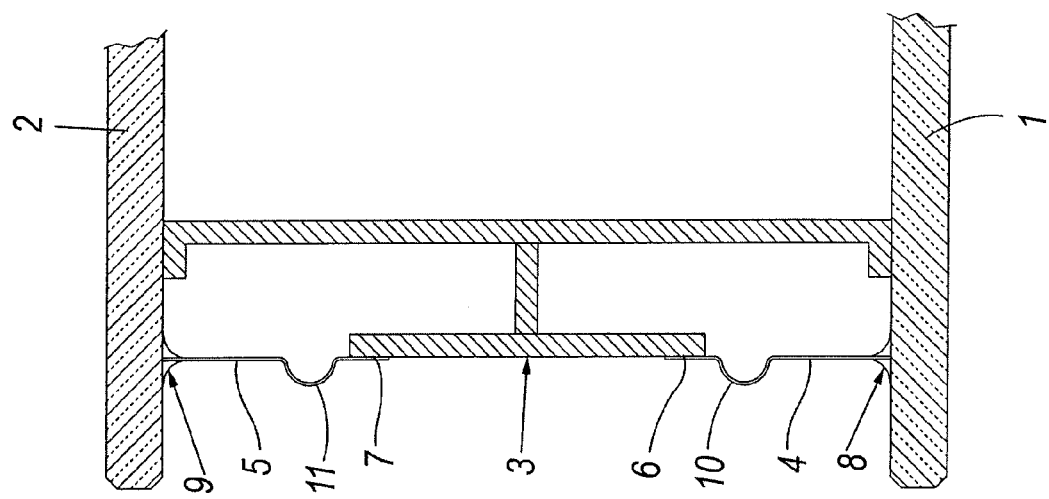
FIG. 3 shows a cross section of the peripheral wall of the vacuum solar thermal panel.
Figure 4:
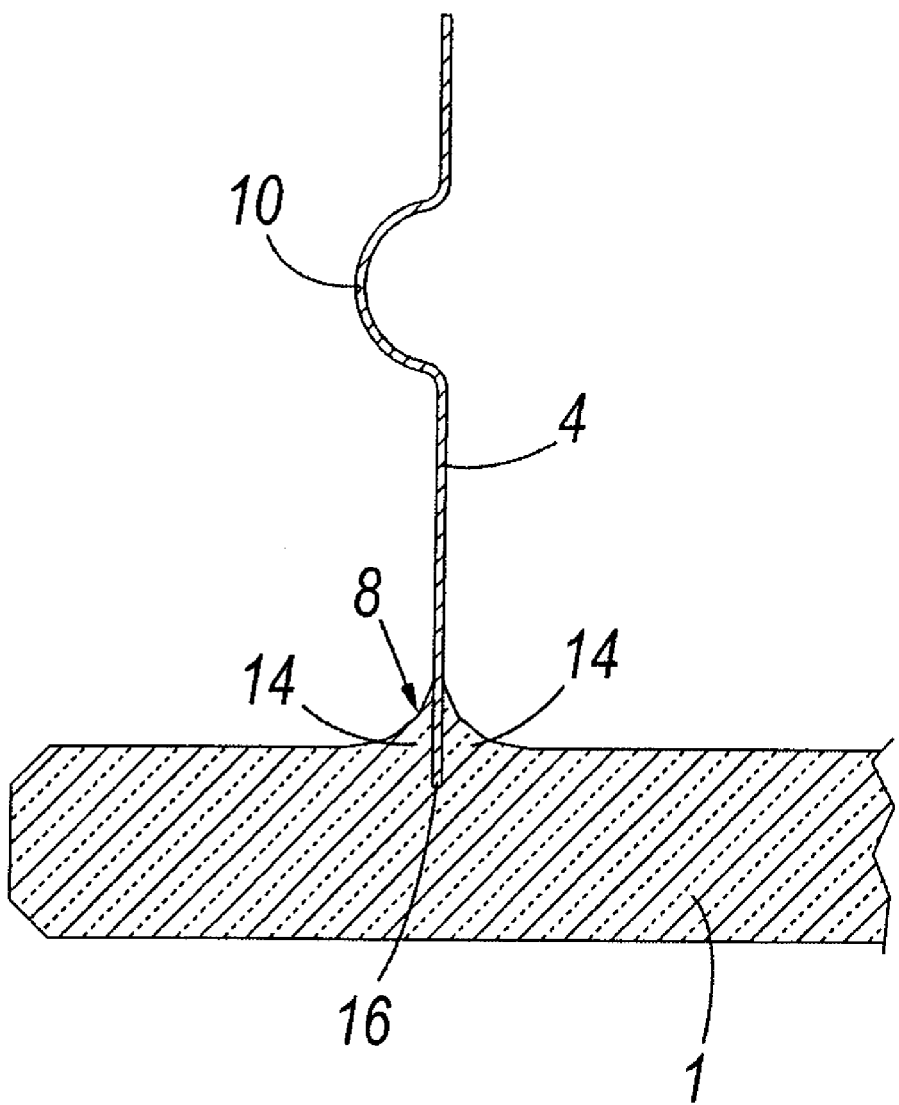
FIG. 4 shows an enlarged cross section of the peripheral wall of the vacuum solar thermal panel, showing a matched bulk glass-metal seal, having the edge of the peripheral belt embedded in the glass plate, according to a first embodiment of the invention.
Figure 5:
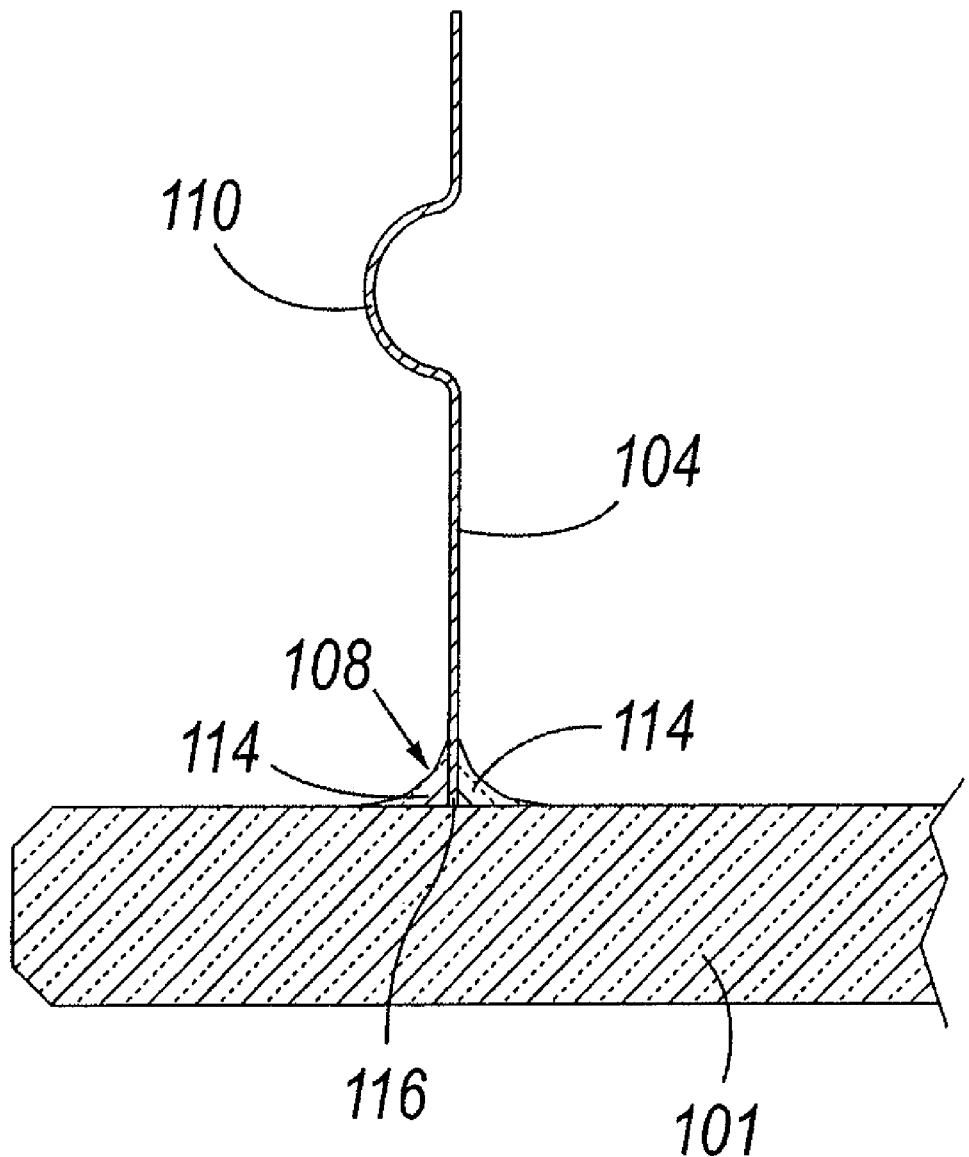
FIG. 5 shows an enlarged cross section of the peripheral wall of the vacuum solar thermal panel, showing a compression bulk glass-metal seal, having the edge of the peripheral belt embedded in a ribbon of frit glass joining the peripheral belt to the glass plate, according to a second embodiment of the invention.

FIGS. 3, 4 and 5 show a cross section of the peripheral wall of the vacuum envelope, said peripheral wall comprising the peripheral frame 3, supporting the two plates 1 (or 101 in FIG. 5) and 2 in a spaced-apart arrangement, and the two peripheral belts 4 (or 104 in FIG. 5) and 5 joined to the peripheral frame 3 with a vacuum tight metal-metal seal 6 (or 116 in FIG. 5) and 7 and joined to the first and second glass plates 1, 101 and 2, by means of a vacuum tight bulk glass-metal seal 8 (108 in FIG. 5) and 9. A controlled expansion alloy with 48% Ni (NiFe alloy 48) is preferably used for the peripheral belt 4 and 5, because of the close match between its thermal expansion coefficient and that of soda-lime glass.

By the expression "bulk glass-metal seal" 8, 9, 108 a vacuum tight seal between a glass plate 1, 2 or 101 and a metallic peripheral belt 4, 5 or 104 is meant, comprising glass 14 or 114 (FIG. 5) embedding an edge 16, 116 (FIG. 5) of the metallic peripheral belt 4, 5 or 104. The vacuum tight bulk glass-metal seal 8, 9, 108 is obtained by fusion and subsequent solidification of the glass 14, 114 embedding the edge 16, 116 (FIG. 5) of the peripheral belt 4, 5, 104, in order to make the glass 14, 114 directly adhere to the peripheral belt.

The vacuum tight bulk glass-metal seal can be of two kinds, according to the first or to the second embodiment of the invention, respectively:

a) it can be a matched glass-metal seal 8 having the edge 16 of the peripheral belt 4 embedded in the glass material 14 resulting from local melting and subsequent solidification of the glass plate 1, (FIG. 4);

b) it can be a compression glass-metal seal 108, having the edge 116 of the peripheral belt 104 embedded in the glass material 114, resulting from the melting of the frit glass material joining the peripheral belt 104 to the glass plate 101 (FIG. 5).

In both embodiments, the glass material 14, 114 adheres directly to the metallic peripheral belt 4, 104. In the first embodiment the glass material 14 is part of the first plate 1, which is always made of glass, whereas in the second embodiment the glass material 114 is some added frit glass paste forming a ribbon following the edge of the metallic peripheral belt 104.

When a glass plate is heated, it first becomes soft at a certain temperature and subsequently it melts at a higher temperature becoming liquid or fused.

In the matched glass-metal seal 8 (FIG. 4) the embedding of the edge of the peripheral belt 4 and the adhesion of the glass material 14 to the metallic peripheral belt 4 are achieved by means of localized fusion of the glass plate 1. Localized glass fusion is obtained by heating the peripheral belt together with the glass plate at a temperature close to, but not exceeding, the glass softening point (for soda-lime glass about 720° C.). The peripheral belt 4 is then further heated (e.g. by induction) above the glass softening temperature (about 800° C.), inserted into glass plate 1 for about 1-2 mm and eventually retracted to allow fused glass to form a meniscus at both sides of the peripheral belt. Eventually, the glass plate 1 is quickly cooled to induce the required pre-stress level, following standard rules for tempering.

In the compression glass-metal seal 108 (FIG. 5) the embedding of the edge of the metallic peripheral 104 belt and the adhesion to the metallic peripheral belt 104 are achieved by melting a frit glass having a much lower softening temperature compared to that of the glass plate, and by joining the peripheral belt 104 to the glass plate 101, once solidified. Frit glass, either vitreous or devitrifying, could be chosen to have a thermal expansion coefficient (X) slightly lower than that of the components to be sealed, in order to provide some additional compression to the seal. In the case of soda-lime glass and NiFe alloy 48, both having a thermal expansion coefficient $\lambda=90*10^{-7}$ $K^{-1}$, a fit glass with around $75*10^{-7}$ $K^{-1}$ could be used. The compression glass-metal seal 108 is obtained by first applying a thick paste, obtained by mixing frit glass powder with a binder and a suitable solvent (for example nitrocellulose and amyl acetate) as a continuous ribbon of about 2 mm height and width on the top of a glass plate, then by inserting the peripheral belt in said frit glass paste ribbon and then firing the realized assembly, kept together by a suitable support structure, in a suitable oven. Frit firing should follow usual thermal cycle as described in material datasheets (for a typical frit glass, firing temperature will reach 450° C. for about 30 minutes). The support structure should be made such as to compensate for thermal expansion difference with respect to the remaining assembly components.

The compression bulk glass-metal seal can also be obtained in a less preferred way by first placing the peripheral belt 104 (FIG. 5) on the surface of the glass plate 1 and subsequently adding the ribbon of frit glass paste 114 on top of the surface of the glass plate 1 at one or both sides of the peripheral belt 104. Said ribbon of frit glass is subsequently melted and solidified again to obtain the glass-metal seal. This latter technique is more complicated than the one described herebefore, and the presence of a ribbon of frit glass on only one side of the peripheral belt would render the glass metal seal more fragile.

Both matched and compression glass-metal seals 8 and 108 can be reinforced by means of suitable epoxy resin encapsulation at both sides of peripheral belt. Epoxy resin for the vacuum side should be chosen such as to have very low outgassing and good stability at high temperature, in order to later withstand a bake-out cycle (e.g. an epoxy resin known with the commercial name of "Torr Seal by Varian" can be used).

The thickness and the height of the peripheral belt 4, 104 should be chosen such as to avoid fissuring under atmospheric pressure, while reducing thermal conduction during welding, to a level not dangerous for the integrity of the glass-metal seals. In the case of a 0.25 mm thick NiFe alloy 48 belt, the height should be about 20 mm. Additionally, in order to further reduce the stress applied to the glass-metal seal due to the atmospheric pressure and thermal expansion, the peripheral belt is made deformable by means of a ribbing 10, 11, 110 (typically of semicircular form and having about 2 mm radius) running for the whole length of the peripheral belt.

When plates 1 and 2 are both made of glass, the peripheral belt is attached thereto by means of a bulk vacuum tight glass-metal seal. If the first plate 1 is made of glass and the second plate 2 is made of metal; a vacuum tight metal-metal seal, obtained for instance by conventional soldering, welding or brazing, can be directly provided to join the peripheral frame to the metal plate.

The vacuum envelope of the solar panel according to the invention also comprises a pumping port 19, typically made of a copper tube, connected to a vacuum pump (not shown). After evacuation of the vacuum envelope, the pumping port 19 may be sealed by pinch-off, a typical method used in refrigeration circuits.

An exit port 20, typically made of a stainless steel tube or bellow, brings the heat absorber pipe 13 outside the vacuum envelope 30, through the peripheral frame 3, while minimizing heat transfer to the same.

A getter pump of known type may also be present inside the vacuum envelope in order to continuously pumping any residual gas with the notable exception of noble ones.

The invention also relates to a method for the production of a vacuum solar thermal panel comprising a vacuum envelope defining a sealed volume, able to withstand atmospheric pressure, when evacuated, and having at least a first plate 1, 2, 101 made of glass, a metallic peripheral belt 4, 5, 104 and a vacuum tight bulk glass-metal seal between the glass plate 1, 2, 101 and the metallic peripheral belt 4, 5, 104.

According to the present invention, the glass material 14, 114 is disposed close to the edge 16, 116 of the peripheral belt 4, 104. Said glass material can be part of said first plate 1 or some added frit glass material 104. Said glass material 14, 114 is heated above its melting temperature and subsequently cooled below said temperature to make the glass material adhering to the peripheral belt and joining it to the glass plate 1, while embedding the edge of the peripheral belt. This can be obtained in two ways: said glass material, positioned close to the edge of the peripheral belt, melted and subsequently solidified again, can come from the glass plate or it can come from a ribbon of frit glass paste, which, when the peripheral belt is disposed with its edge on the surface of the glass plate 101, is placed at both sides of the peripheral belt 104.

When glass forming the bulk glass-metal seal is coming from the glass plate 1 (matched glass-metal seal), the method can be described by the following steps:

the glass plate 1 is heated to a temperature close to but not exceeding its softening temperature;

the peripheral belt 4 is heated to a temperature above the glass plate 1 softening temperature;

an edge 16 of the peripheral belt 4 is pressed against the surface of the glass plate 1 in order to achieve localized fusion and to insert the edge into the glass plate 1, so that the edge 16 of the peripheral belt 4 is embedded by the glass 14 of the glass plate 1;

the peripheral belt 4 is retracted from the glass plate 1, to form a meniscus at both sides of the edge 16 of the peripheral belt 4;

the glass plate 1 and the peripheral belt 4 are cooled to below the glass plate softening temperature, providing a vacuum tight glass-metal seal between the glass plate 1 and the metallic peripheral belt 4.

When the glass forming the bulk glass-metal seal is coming from a ribbon of frit glass paste (compression glass-metal seal), the method can be described by the following steps:

a frit glass paste comprising frit glass material is provided, said frit glass paste being obtained by mixing together a powder of frit glass material, a solvent and a binder;

the frit glass paste is placed on the top of the surface of the glass plate 101, to form a continuous ribbon;

the edge 116 of the peripheral belt 104 is inserted in the ribbon of the frit glass paste contacting also the surface of the glass plate 101;

the frit glass paste is heated and melted to form a meniscus of fused frit glass between the side of the peripheral belt 104 and the surface of the glass plate 101;

the frit glass is cooled and solidified thus providing a vacuum tight bulk glass-metal seal between the glass plate 101 and the metallic peripheral belt 104.

The method for producing a matched glass-metal seal is preferred when thermal pre-stress of glass plate is required, since it can be applied during pre-stress treatment at practically zero-cost, while the method for producing a compression glass-metal seal should be used when no thermal pre-stress of glass plate is envisaged (i.e. in the case of stratified glass), since it requires much lower temperature.

In both cases (matched or compression glass-metal seal) the glass metal seal could then be reinforced by means of suitable epoxy at both sides of the peripheral belt as described above.

One advantage of the present invention is that it provides a thermal solar panel provided with a vacuum tight envelope having a glass-metal seal very simple to realize and yet very reliable.

The peripheral belt is made deformable by the presence of ribbing. This allows lowering the stresses induced in the glass-metal seal by thermal expansion of the components and by the pressure difference between the inside and the outside of the envelope during evacuation of the same.

A further advantage is that the envelope makes no use of toxic or dangerous materials.

The invention claimed is:

1. A vacuum solar thermal panel comprising: a vacuum envelope defining a sealed volume, able to withstand the atmospheric pressure when evacuated; at least one heat absorber being disposed inside the vacuum envelope; a pipe entering and exiting the envelope and being in contact with the heat absorber, wherein said vacuum envelope includes a first plate made of glass, a peripheral wall element disposed substantially at the periphery of the first plate, and a metallic peripheral belt joining the peripheral wall element to the first plate, wherein said metallic peripheral belt is joined to the first plate by a vacuum tight bulk glass-metal seal, which includes glass material, said vacuum tight glass-metal seal being obtained by fusion and subsequent solidification of said glass material such that the glass material adheres to two opposite surfaces of the metallic peripheral belt, wherein said vacuum solar thermal panel includes an inner support element and a connecting portion connecting the inner support element to the peripheral wall element, said inner support element being in contact with said first plate and providing support such that the first plate is supported by the inner support element.

2. The vacuum solar thermal panel according to claim 1, wherein said glass material of the vacuum tight bulk glass-metal seal embeds the peripheral belt.

3. The vacuum solar thermal panel according to claim 1, wherein said vacuum tight bulk glass-metal seal is obtained by localized fusion and subsequent solidification of glass material of the first plate close to the edge of the peripheral belt.

4. The vacuum solar thermal panel according to claim 1, wherein said vacuum tight bulk glass-metal seal comprises a ribbon of frit glass joining the metallic peripheral belt to the first plate.

5. The vacuum solar thermal panel according to claim 1, wherein said metallic peripheral belt comprises at least one ribbing making said metallic peripheral belt elastically deformable.

6. The vacuum solar thermal panel according to claim 1, further comprising: a second plate, substantially parallel to the first plate, in order to obtain a flat thermal solar panel, the heat absorber being placed between the first and the second plate inside the vacuum envelope.

7. The vacuum solar thermal panel according to claim 6, wherein said second plate is made of glass, in order to have a double sided solar panel.

8. A method for the production of a vacuum solar thermal panel comprising a vacuum envelope defining a sealed volume, able to withstand the atmospheric pressure when evacuated, said method comprising: providing at least one heat absorber being disposed inside the vacuum envelope; providing a pipe entering and exiting the envelope and being in contact with the heat absorber; providing a first plate made of glass, a peripheral wall element disposed substantially at the periphery of the first plate, and a metallic peripheral belt joining the peripheral wall element to the first plate; providing an inner support element and a connecting portion connecting the inner support element to the peripheral wall element, said inner support element being in contact with said first plate and providing support such that the first plate is supported by the inner support element; providing a vacuum tight glass-metal seal between the first plate and the metallic peripheral belt, the glass material being disposed close to the edge of the peripheral belt, heated above a melting temperature of the glass material and subsequently cooled to below said temperature, in order to allow said glass material to adhere to the metallic peripheral belt and join the metallic peripheral belt to the first plate; providing a frit glass paste comprising frit glass material and a binder; placing the frit glass paste on the top of the surface of the first plate, to form a continuous ribbon; inserting the edge of the peripheral belt in the ribbon of the frit glass paste, contacting also the surface of the glass plate; heating and melting the frit glass paste to form a meniscus of fused frit glass between at least one the side of the peripheral belt and the surface of the first plate; cooling the frit glass such that the frit glass is solidified thus providing a compression vacuum tight bulk glass-metal seal between the first plate and the metallic peripheral belt.

9. A method for the production of a vacuum solar thermal panel comprising a vacuum envelope defining a sealed volume, able to withstand the atmospheric pressure when evacuated, said method comprising: providing a first plate made of glass, a peripheral wall element disposed substantially at the periphery of the first plate, and a metallic peripheral belt joining the peripheral wall element to the first plate; providing an inner support element and a connecting portion connecting the inner support element to the peripheral wall element, said inner support element being in contact with said first plate and providing support such that the first plate is supported by the inner support element; providing a vacuum tight glass-metal seal between the first plate and the metallic peripheral belt, the glass material being disposed close to the edge of the peripheral belt, heated above a melting temperature of the glass material and subsequently cooled to below said temperature, in order to allow said glass material to adhere to the metallic peripheral belt and join the metallic peripheral belt to the first plate; heating the first plate to a temperature close to but not exceeding a softening temperature; heating the peripheral belt to a temperature above the first plate melting temperature; pressing an edge of the peripheral belt against the first plate in order to achieve localized fusion and so that the edge of the peripheral belt is embedded in the glass of the first plate; and cooling the first plate and the peripheral belt to below the first plate softening temperature, providing a matched vacuum tight glass-metal seal between the first plate and the metallic peripheral belt.

10. The method according to claim 9, further comprising:
retracting, after the insertion of the edge of the peripheral belt into the first plate, the peripheral belt from the first plate to form a meniscus on at least one side of the peripheral belt.

* * * * *